United States Patent [19]

Burnett et al.

[11] Patent Number: 4,993,112
[45] Date of Patent: Feb. 19, 1991

[54] CARCASS FAT TRIMMER

[76] Inventors: Donald L. Burnett, 2143 Altura Ave., Orange, Calif. 92667; J. Hampton Riley, 3261 Santa Maria, Fullerton, Calif. 92635

[21] Appl. No.: 449,119

[22] Filed: Dec. 8, 1989

Related U.S. Application Data

[63] Continuation of Ser. No. 353,915, May 18, 1989, abandoned.

[51] Int. Cl.$^5$ ................................................ A22B 5/16
[52] U.S. Cl. ........................................ 452/134; 30/276; 99/539; 452/133; 452/164
[58] Field of Search ............... 17/21, 50, 1 R; 99/584, 99/585, 589, 591; 83/870, 360, 364, 368, 370; 30/276, 356

[56] References Cited

U.S. PATENT DOCUMENTS

| | | | |
|---|---|---|---|
| 1,456,666 | 5/1923 | Barry | 17/67 |
| 1,591,860 | 7/1926 | McGinnis . | |
| 1,603,061 | 10/1926 | Browne . | |
| 1,642,802 | 9/1927 | Barry | 17/67 |
| 2,481,182 | 9/1949 | Waters | 17/16 |
| 2,598,509 | 5/1952 | Corbin | 17/67 |
| 2,720,002 | 11/1955 | Waters | 17/16 |
| 2,836,401 | 5/1958 | Phelan . | |
| 4,071,923 | 2/1978 | Smith | 17/21 |
| 4,186,461 | 2/1980 | Leining | 17/21 |
| 4,451,953 | 6/1984 | Leining | 17/21 |
| 4,494,311 | 1/1985 | McCullough | 30/276 |

*Primary Examiner*—Willis Little
*Attorney, Agent, or Firm*—Christie, Parker & Hale

[57] ABSTRACT

A hand-held, power-driven trimming device, especially useful in trimming excess carcass fat, includes a cylindrical housing having a hollow interior, a rotary-driven cutter blade assembly with multiple helical cutting blades mounted for rotation in the housing, and a handle on the housing for holding the trimming device during use. The helical cutter blade assembly is mounted along the axis of the housing through a cantilever mount inside a sealed lubrication chamber in one end of the housing. The blade assembly is preferably driven from a remote power source, such as an electric motor, coupled to a flexible drive shaft passing through the handle. The flexible drive shaft powers a worm or helix gear supported by bearings inside the chamber. The worm or helix gear drives a helix gear supported in the sealed lubrication chamber by bearings on the cantilevered drive shaft for the rotary blade assembly. A discharge blade preferably in the form of a stationary auger blade is mounted axially in the housing inside the rotary cutter blade assembly. The auger is restrained from rotation by a fixed shaft passing through the housing and through the cutter drive and support shaft in the sealed chamber. The helical cutter blades rotate close to the outer edge of the stationary auger and create a scissor-like counter-rotation action on material trimmed by the rotary cutter blades. The trimmed material enters the interior of the rotating blades and is then forced axially along the auger owing to its serpentine form working in cooperation with the counter-rotating helical cutter blades to continuously remove trimmed material from the blades and expel the material from an open end of the cylindrical housing during use.

19 Claims, 4 Drawing Sheets

CARCASS FAT TRIMMER

This is a continuation of Ser. No. 353,915, filed May 18, 1989, now abandoned.

FIELD OF THE INVENTION

This invention relates to trimming devices, and more particularly to an improved hand-held, power-driven trimming device especially useful for removing excess fat from animal carcasses.

BACKGROUND OF THE INVENTION

In the meat processing industry there is a need to efficiently trim excess fat from the carcasses of animals after slaughter. It would be useful to remove excess fat from carcasses to a reasonably controllable layer thickness, in addition to removing the fat efficiently. With better control during the trimming process, more excess fat can be removed while leaving on a reasonably uniform, thinner layer of fat for leaner cuts, if desired.

The fat of pork has a relatively soft texture and consistency, and is therefore easier to trim than the fat of beef which is tougher and therefore more difficult to cut and remove, particularly to a generally uniform and controlled thickness. This has especially been a problem in the past where meat cutters have used a knife to cut off excess fat from beef carcasses rather than using power-operated trimming devices which are more useful in removing the fat of pork.

It is desirable to skin off as much excess fat as possible at the meat packing plant, rather than trimming off any substantial amount of fat after shipping the carcasses to their local destinations.

Excess fat removed at the central packing house under USDA inspection is considered "edible fat" which has a substantially higher market value than inedible fat. Edible fat is sold in aftermarkets such as for rendering to make cooking oil. According to government regulations, beef carcasses or by-products, such as beef fat, can be shipped from one USDA inspected establishment to another USDA establishment and the product still is considered edible. But once the beef carcass or cuts leave a USDA inspected establishment and are further processed at a local supermarket, where the excess fat is removed without the benefit of USDA inspection, that excess fat is then considered inedible. Thus, by removing more excess fat at the USDA inspected packing plant, its market value as edible fat is enhanced.

In the subsequent breaking and cutting process, beef carcasses are cut up into approximately 160 separate pieces needing to be trimmed of fat. It is more efficient to trim off as much excess fat as necessary at the central meat packing plant, rather than shipping the carcasses to the local destination for trimming excess fat. In addition, transportation costs are increased by shipping carcasses with substantial amounts of untrimmed fat. Labor costs are also increased substantially when trimming excess fat at the local destination, as opposed to using more unskilled labor for trimming excess fat at the central meat packing plant.

The present invention provides a carcass fat trimming tool adapted to efficiently trim excess fat from the carcasses of animals, especially excess fat from beef carcasses, thereby conserving edible fat and reducing shipping costs and subsequent labor costs during the breaking and cutting process. The invention, in one embodiment, comprises a hand-held, power-driven rotary trimming device which trims excess fat from carcasses and removes the trimmed fat rapidly and in a continuous flow. In the past, a number of hand-held and power-driven trimming devices have been used in the food processing industry. Some of these devices may be useful in trimming or skinning fruits or vegetables, but they are not necessarily adaptable for use in the meat packing industry to trim excess fat from animal carcasses, especially beef. Some prior art fat trimming devices are reasonably useful in efficiently trimming fat from pork, but the softer fat of pork can be more easily removed by these devices, whereas the same tools are not capable of removing excess fat from beef carcasses because of the tougher nature of the fat. Other prior art trimming devices cut the material with a chopping action which cannot be adapted to smoothly and efficiently remove fat from animal or beef carcasses in a rapid and continuous flow. The design and operation of a power-driven, hand-held trimming device, in particular, requires that the trimmed material not clog the device or otherwise interrupt the continuous flow or expulsion of the trimmed material, since speed and smoothness of operation are critical. Many prior art trimming devices suffer from this problem, if used as a carcass fat trimmer, especially when removing fat from beef carcasses.

SUMMARY OF THE INVENTION

Briefly, one embodiment of this invention provides a power-driven, hand-held trimming device comprising a housing having a hollow interior and a cutter blade assembly rotatably mounted within the interior of the housing. The cutter blade assembly includes multiple elongated blades, each spaced radially outwardly from and extending generally axially with respect to the blade assembly. The cutter blades are spaced apart circumferentially around a hollow interior region extending axially along the blade assembly. The blade assembly is rotated about its axis by power supplied from a external source, and the blade assembly is positioned for rotation relative to the housing so that material adjacent the housing which is cut by the rotating blades can be drawn into the housing and into the interior region within the blade assembly. A discharge device such as an auger blade is mounted in the hollow interior region within the cutter blade assembly for cooperating with the rotating cutter blades to cause the trimmed material entering the housing to be conveyed axially along the discharge blade and toward the end of the housing for continuous discharge.

In a preferred form of the invention, the rotary-driven cutter blade assembly includes multiple helical cutting blades mounted for rotation in the housing. A handle on the housing is arranged for holding the trimming device during use. The helical cutter blade assembly is mounted on the axis of the housing by a cantilevered drive system inside a sealed lubrication chamber in one end of the housing. The blade assembly is preferably driven from the remote power source, such as an electric motor coupled to a flexible drive shaft passing through the handle. In a preferred drive arrangement, the drive shaft powers a gear drive supported by bearings inside the sealed chamber. The gear drive powers a cantilevered drive shaft of the rotary blade assembly. The auger blade is preferably mounted in a stationary position extending axially along the housing inside the rotating cutter blade assembly. In this embodiment, the auger blade is restrained from rotation by a fixed shaft passing through the cutter blade support shaft and through the sealed chamber. The helical cutting blades rotate close to the outer edge of the stationary auger blade and create a scissor-like counter-rotation action on material trimmed by the rotating blades. During use, the removed material is drawn into the interior of the blade housing and is forced axially along the auger blade, owing to its serpentine form working in cooperation with the counter-rotation of the helical cutter blades, to continuously expel trimmed material from an open end of the blade housing.

The trimming device of this invention slices and moves the excess material through the cutter blade housing and exhausts it out the end of the device in a continuous flow, thereby removing material, such as excess fat from beef carcasses, in a minimum time. Use of the invention conserves edible fat and reduces shipping and labor costs, while enhancing the value of the trimmed product.

These and other aspects of the invention will be more fully understood by referring to the following detailed description and the accompanying drawings.

DETAILED DESCRIPTION

Figure 1:
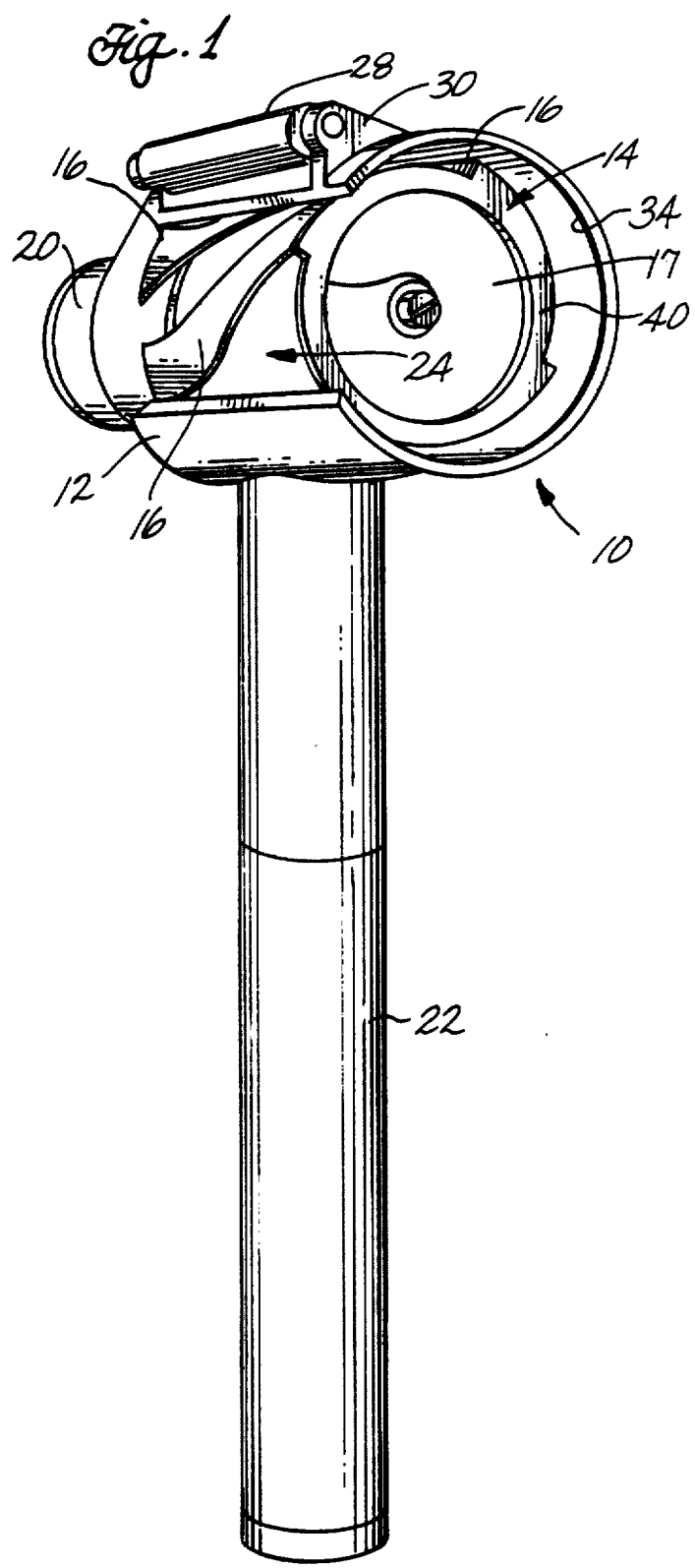
FIG. 1 is a perspective view illustrating a carcass fat trimmer according to principles of this invention.
Figure 2:
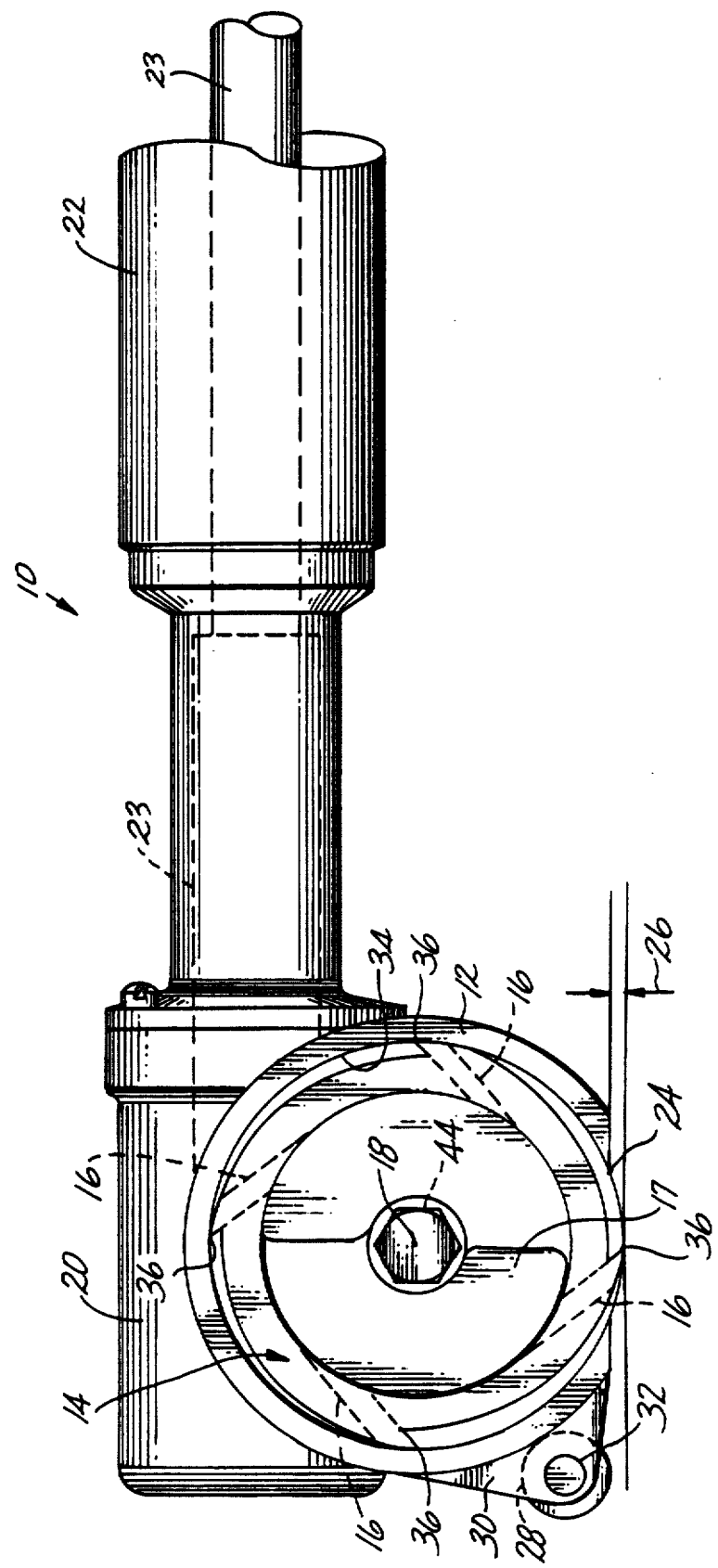
FIG. 2 is a side view illustrating use of the trimming device.

FIGS. 1 and 2 illustrate a carcass fat trimmer 10 according to principles of this invention. The trimming device is described briefly below with respect to FIGS. 1 and 2. More detailed construction and operation of the trimming device will be explained below with reference to FIGS. 3 through 6.

The trimming device includes an elongated, cylindrical housing 12 having a hollow interior. A helical cutter blade assembly 14 is mounted for rotation inside the cylindrical housing. The cutter blade assembly preferably includes multiple helical cutting blades 16. In the illustrated embodiment, there are four helical cutting blades equidistantly spaced apart circumferentially around the blade assembly. The helical cutting blades 16 each can have multiple blade segments. Each helical cutting blade extends generally axially with respect to the blade assembly. The helical cutting blades are spaced apart uniformly around the hollow interior region within the blade assembly.

An auger blade 17 is mounted in a stationary position in the hollow interior region within the blade assembly. The auger and the blade assembly are mounted on a common axis 18 of the cylindrical housing 12. A sealed lubrication chamber 20 mounted at one end of the cylindrical housing 12 contains bearings, gears, and drive shafts for rotating the cutter blade assembly relative to the stationary auger.

An elongated handle 22 is fastened to the bottom of the sealed chamber 20. A flexible drive shaft 23 extends through the handle and into the sealed chamber 20 for driving the gear system for rotating the cutter blade assembly during use. The flexible drive shaft 23 extends through the handle from a remote power source, such as an electric motor (not shown).

A wide opening 24 is formed along one side of the cylindrical housing 12. The spiral cutting blades 16 on the blade assembly rotate into the opening 24 when the cutter assembly is driven. The cutting edge of each blade projects out beyond the edge of the housing opening by a certain select distance 26, shown in FIG. 2. This distance can be controlled by the position of an elongated roller 28 mounted on an axle 32, between flanged roller mounts 30 carried on the housing adjacent the opening. By manually positioning the roller 28 with respect to the opening at 24, the distance 26, and thus the amount of material trimmed during use, can be controlled. A large circular opening 34 is formed at the end of the tubular housing 12 opposite from the sealed chamber 20. During use, material removed by the cutter blade assembly during trimming operations enters the hollow interior region within the rotating cutter assembly and is forced axially along the helical auger blade 17 toward the opening 34 at the end of the housing for continuous discharge.

Figure 3:
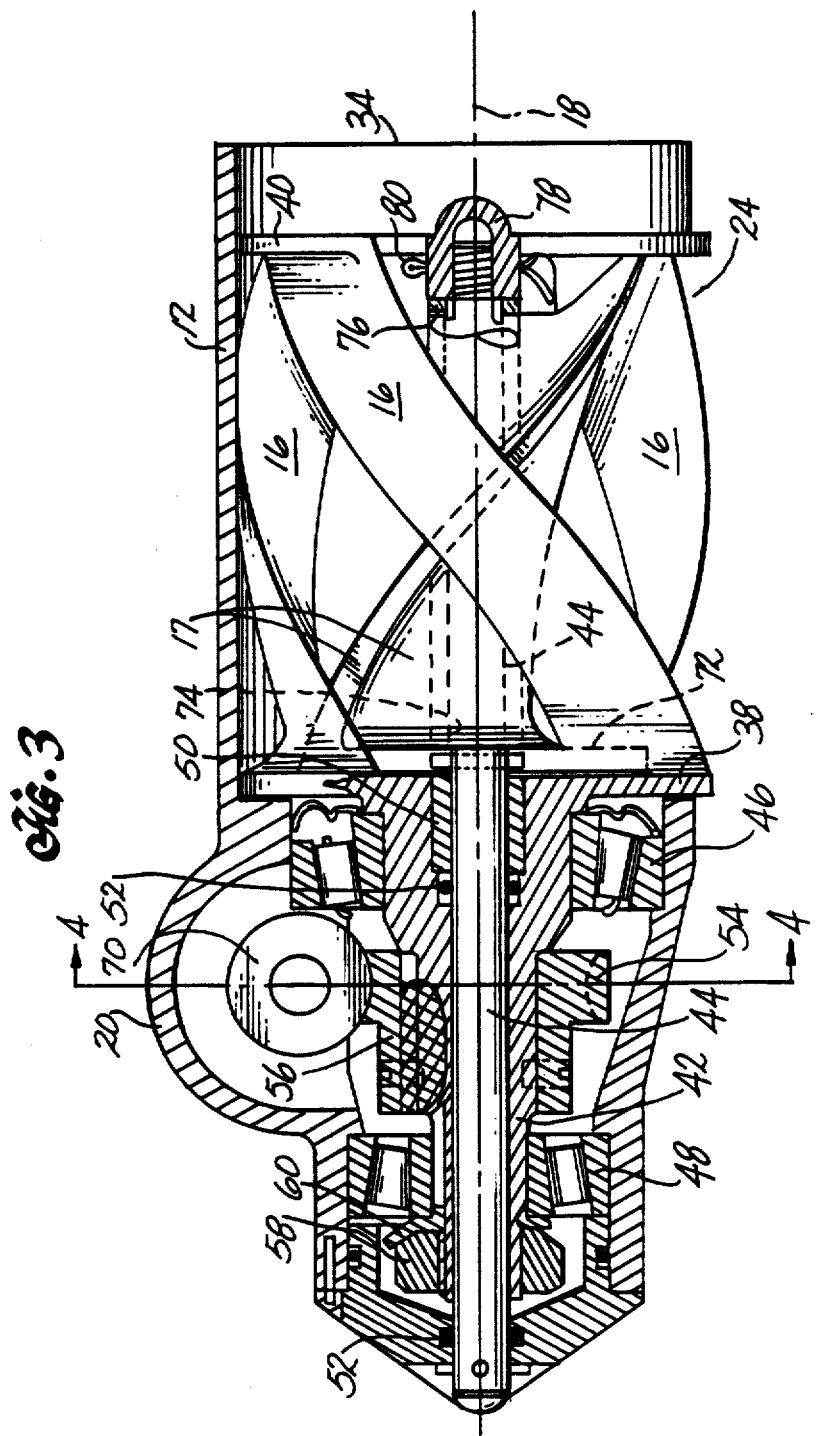
FIG. 3 is a cross-sectional view illustrating a drive system for the trimming device.
Figure 5:
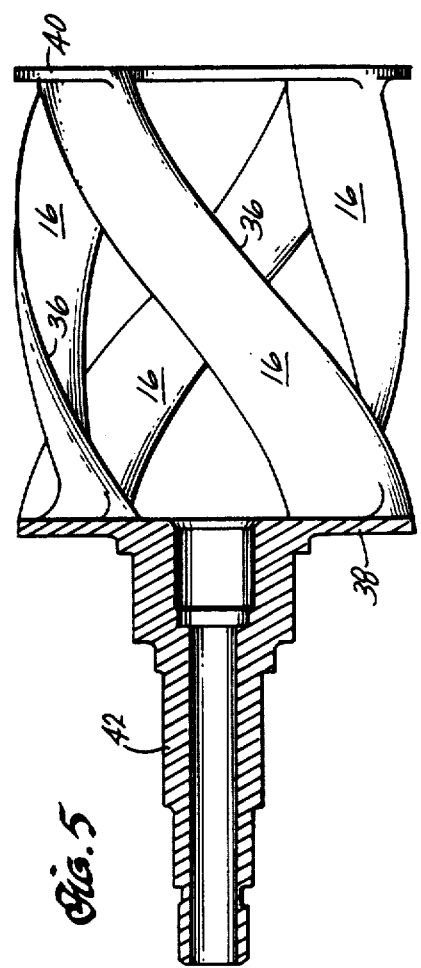
FIG. 5 is a side elevation view partly in cross section illustrating a helical cutting blade assembly of the trimming device.

FIGS. 2, 3, and 5 best illustrate detailed construction of the cutter blade assembly 14. The spiral cutting blades 16 each have a sharp, helical, outer cutting edge 36 having an angle of wrap of about 90° extending from one end to the other of the blade assembly. The opposite ends of the blades are rigidly affixed to a circular inner plate 38 and a circular outer ring 40, each extending generally perpendicularly to the rotational axis of the blade assembly. This arrangement provides a reel-type cutter blade assembly in which each helical blade edge 36 rotates into the opening 24 in the housing in sequence when the blade assembly is rotated about its axis.

The blade assembly is mounted within the interior of the housing 12 by a cantilevered mounting arrangement which includes a tubular drive shaft 42, best shown in FIG. 5. The shaft 42 is mounted for rotation about a stationary auger shaft 44. The tubular cutter blade drive shaft 42 and an end portion of the auger shaft 44 both extend coaxially through the sealed lubrication chamber 20 adjacent the tubular housing 12. The opposite end portion of the auger shaft 44 extends through the tubular housing 12 along the axis of rotation of the cutter blade assembly. The auger 17 is rigidly mounted to the auger shaft. The tubular drive shaft 42 is mounted within the sealed lubrication chamber 20 by a bearing and seal 46 at the end of the shaft adjacent the plate 38 and by a bearing 48 at the opposite end of the chamber. An auger bushing 50 and O-ring seals 52 are mounted between the tubular drive shaft 42 and fixed auger shaft 44. A helix gear 54 is affixed for rotation to the drive shaft 42 within the sealed chamber. The helix gear is keyed to the rotor shaft by a Woodruff key 56. At the outer end of the drive shaft 42, the bearing 48 is affixed by a bearing nut 58 and lock washer 60.

The rotatable drive shaft 42 is driven preferably by an external power source, such as an electric motor, although pneumatic or hydraulic power also can be used to actuate the cutter. Preferably, the blade assembly is driven by the flexible drive shaft 23 which extends through the handle 22 and into the sealed chamber 20.

The flexible drive shaft 23 can be the type of flexible shaft manufactured by Suhner Industrial Products Corp. of Rome, Ga. The flexible drive shaft is coupled to a rigid drive shaft 62 extending through the sealed lubrication chamber 20 perpendicular to the axis of the blade assembly. Steel bearings 64 and 66 mount opposite ends of the drive shaft for rotation in the sealed chamber. The drive shaft also carries a bushing 68 and a worm gear 70 which rotates with rotation of the drive shaft 62. The worm gear engages the helix gear 54 which is keyed to the rotor shaft 42 so that operation of the remotely located electric motor rotates the flexible shaft which, in turn, rotates the drive shaft 62 for driving the rotor shaft 42 through its connection from the helix gear to the worm gear.

Figure 6:
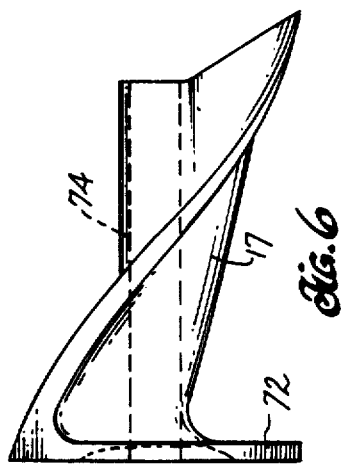
FIG. 6 is a side elevation view illustrating an auger for use in the trimming device.
Figure 4:
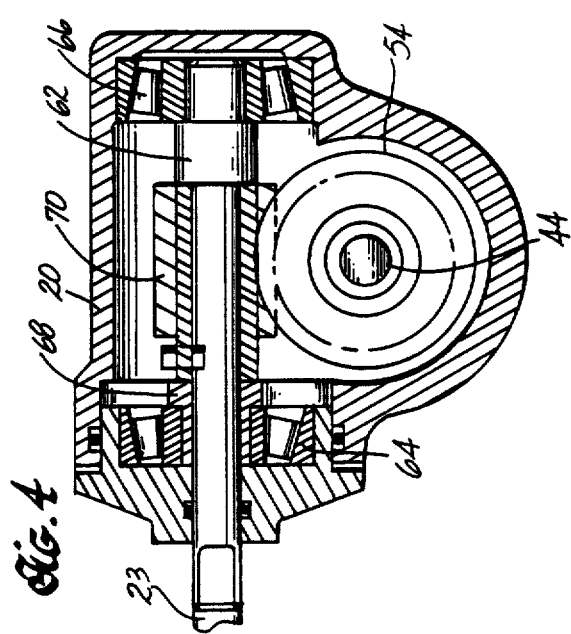
FIG. 4 is a cross-sectional view taken on line 4—4 of FIG. 3.

FIGS. 3 and 6 best illustrate the auger blade 17 which includes a thin metal blade with a spiral turn extending axially along the axis common to the rotor axis 18. The auger blade preferably has an angle of wrap of about 180° from end to end. A circular plate 72 at the inside end of the auger mounts closely against the plate 38 which forms the outer wall of the sealed chamber 20. The outside face of the plate 72 is keyed to the auger shaft 44 for rigidly fastening the inside end of the auger in a fixed position inside the blade assembly 14. The auger has a tubular passage 74 extending along its axis. The auger shaft 44 extends through this tubular passage 74 in the auger blade for mounting the auger in a fixed position inside the blade assembly. Alternatively, the auger blade can be mounted to counter-rotate with respect to the cutter blade assembly. The spiral form of the fixed auger blade 17 wraps in a direction opposite to the direction in which the spiral cutting blades 16 rotate about the axis of the blade assembly. The portion of the auger shaft 44 which extends through the blade assembly is cantilevered from the mounting of the auger shaft inside the sealed chamber. The outer end of the auger shaft 44 is mounted inside the tubular passage 74 through the auger by an annular spacer washer 76, a Castle nut 78, and a cotter pin 80.

During use, material, such as a layer of fat from an animal carcass, can be trimmed from the carcass by the trimming device 10. The trimming device is held by hand with the handle 22, and the electric motor powers the drive assembly in the trimming device to drive the serpentine cutter blade assembly. The opening 24 to the housing is placed against the layer of material to be removed and positioned by means of the roller 28 to control the depth of material to be removed. The edges of the serpentine cutter blades protrude from the housing and slice the product as the trimming device is drawn across the surface to be trimmed. Material which has been sliced by the serpentine cutting blades is constantly drawn into the hollow interior region within the cutter blade assembly. The angled blades sweep the product inward and around as a paddle to contact the blade of the inner auger, which is stationary, and therefore produces a counter-rotation action with the cutting blades. The opposing spiral auger blade functions with the rotating cutter blades to wipe the product and sweep the product with an axial component of force toward the open end of the housing, thus expelling the product from the blade housing in a continuous flow. With each revolution of the cutter, a thickness of product is sliced by each cutter blade, and the material is drawn into the hollow center of the cutter and scraped free by the auger blade, whose opposite serpentine angle and relative counter-rotation acts on the product in a scissor-like manner to constantly squeeze the trimmed product and force the product to be expelled continuously out the open end of the housing. The material removed by the trimming device can be continuously drawn away from the open end of the chamber by a conduit (not shown), for example.

In certain instances, including the trimming of a layer of fat from animal carcasses, use of the stationary auger in combination with the counter-rotating blade assembly is highly efficient in removing the trimmed material. The consistency and texture of animal fat and other substances will clog and fail to flow through and out the rotary cutter without the aid of the internal auger providing the counter-rotating action to the product and by means of its internal serpentine and tapered form to scrape and expel the product out of the end opening.

Thus, with the use of the present invention, labor costs are reduced, shipping costs are reduced, higher-priced edible fat can be conserved, packaging costs are reduced, and more material can be used without discounting because of lower yield grades.

What is claimed is:

1. A power-driven hand-held trimming device comprising:
    a housing having a hollow interior;
    a multiple cutter blade assembly mounted axially within the interior of the housing, the cutter blade assembly including separate elongated blades, each spaced radially outwardly from and extending generally axially, with respect to the blade assembly, the cutter blades being spaced apart around a hollow interior region within the cutter blade assembly;
    means for rotating the cutter blade assembly about its axis, including means for positioning the blade assembly for rotation relative to the housing so that material adjacent the housing which is cut by the outer cutting edges of the blades can be drawn into the housing and into the interior region within the blade assembly; and
    discharge means mounted in said hollow interior region within the blade assembly for cooperating with the rotating cutter blades for applying an axial force on the material cut off by the cutter blades and entering the housing for causing said material to be conveyed axially along the discharge means and toward an end of the housing for continuous discharge, in which the discharge means comprise an auger mounted in the housing in a stationary position inside the rotating cutter blade assembly.

2. Apparatus according to claim 1 in which the housing has an open end toward which the material entering said hollow interior region is conveyed for discharge from the housing.

3. Apparatus according to claim 1 in which the cutter blade assembly and auger are mounted on a common axis.

4. Apparatus according to claim 1 in which the outer edge of the auger is close to inner edges of the blades.

5. Apparatus according to claim 1 in which the cutter blades are helical.

6. Apparatus according to claim 1 in which the drive means are contained in a sealed lubrication chamber adjacent an end of the cutter blade assembly.

7. Apparatus according to claim 6 in which the cutter blade drive means comprises a cantilevered drive which includes a hollow shaft in the sealed chamber, and further including an elongated shaft for mounting the auger and in which the auger shaft extends axially through the hollow shaft in the sealed chamber.

8. Apparatus according to claim 1 in which the cutter blade assembly is powered from a rotary drive shaft extending through a handle on the housing for use in holding the trimming device during use.

9. A power-driven, hand-held trimming device comprising:
   a housing having a hollow interior;
   a multiple cutter blade assembly mounted axially within the interior of the housing, the cutter blade assembly including separate elongated helical cutter blades each spaced radially outwardly from and extending generally axially with respect to the blade assembly, the cutter blades being spaced apart around a hollow interior region within the cutter blade assembly;
   means for rotating the cutter blade assembly about its axis, including means for positioning the blade assembly for rotation relative to the housing so that material adjacent the housing which is cut by the rotary outer cutting edges of the blades can be drawn into the housing and into the interior region within the blade assembly; and
   an auger mounted within said hollow interior region within the blade assembly for cooperating with the rotating cutter blades in a spiral counter-rotating action to cause the material cut by the cutter blades and entering the housing to be conveyed axially along the auger and toward an end of the housing for continuous discharge.

10. Apparatus according to claim 9 in which the housing has an open end toward which the material entering said hollow interior region is conveyed by the auger for discharge from the housing.

11. Apparatus according to claim 9 in which the outer edge of the auger is close to inner edges of the blades.

12. Apparatus according to claim 9 in which the drive means are contained in a sealed lubrication chamber adjacent an end of the cutter blade assembly.

13. Apparatus according to claim 9 in which the cutter blade drive means comprises a cantilevered drive which includes a hollow shaft in the sealed lubrication chamber, and further including an elongated shaft for mounting the auger and in which the auger shaft extends axially through the hollow shaft in the sealed lubrication chamber.

14. Apparatus according to claim 9 in which the auger is mounted in a stationary position within cutter blade assembly.

15. A process for removing a layer of excess material by contacting the exterior of said material with a trimming device having a power-driven cutter blade assembly rotatably mounted within an exterior housing wherein a portion of the cutter blade assembly rotates into an opening in a portion of the housing during use, the process comprising applying power to said cutter blade assembly for rotating it and contacting the exterior of said excess material with a portion of the power-driven blade assembly which rotates into said opening in the housing so the cutter blade assembly cuts off a layer of said material and draws the cut material into an interior region within the rotating cutter blade assembly, and continuously removing the cut material from the housing by forcing it against an auger blade mounted within the interior of the rotating cutter blade assembly so that the material cut by the rotating blades and entering the housing is conveyed axially along the auger blade and toward an end of the housing for continuous discharge.

16. The process according to claim 15 in which the auger blade is stationary, and the cutter blade assembly comprises multiple rotating cutter blades rotating around the circumference of the auger blade.

17. The process according to claim 16 in which the cutter blades are each of spiral configuration.

18. The process according to claim 17 in which the trimming device is used to remove carcass fat from beef.

19. The process according to claim 15 in which the trimming device is used to remove the fat of animal carcasses.

* * * * *